Patented Oct. 22, 1946

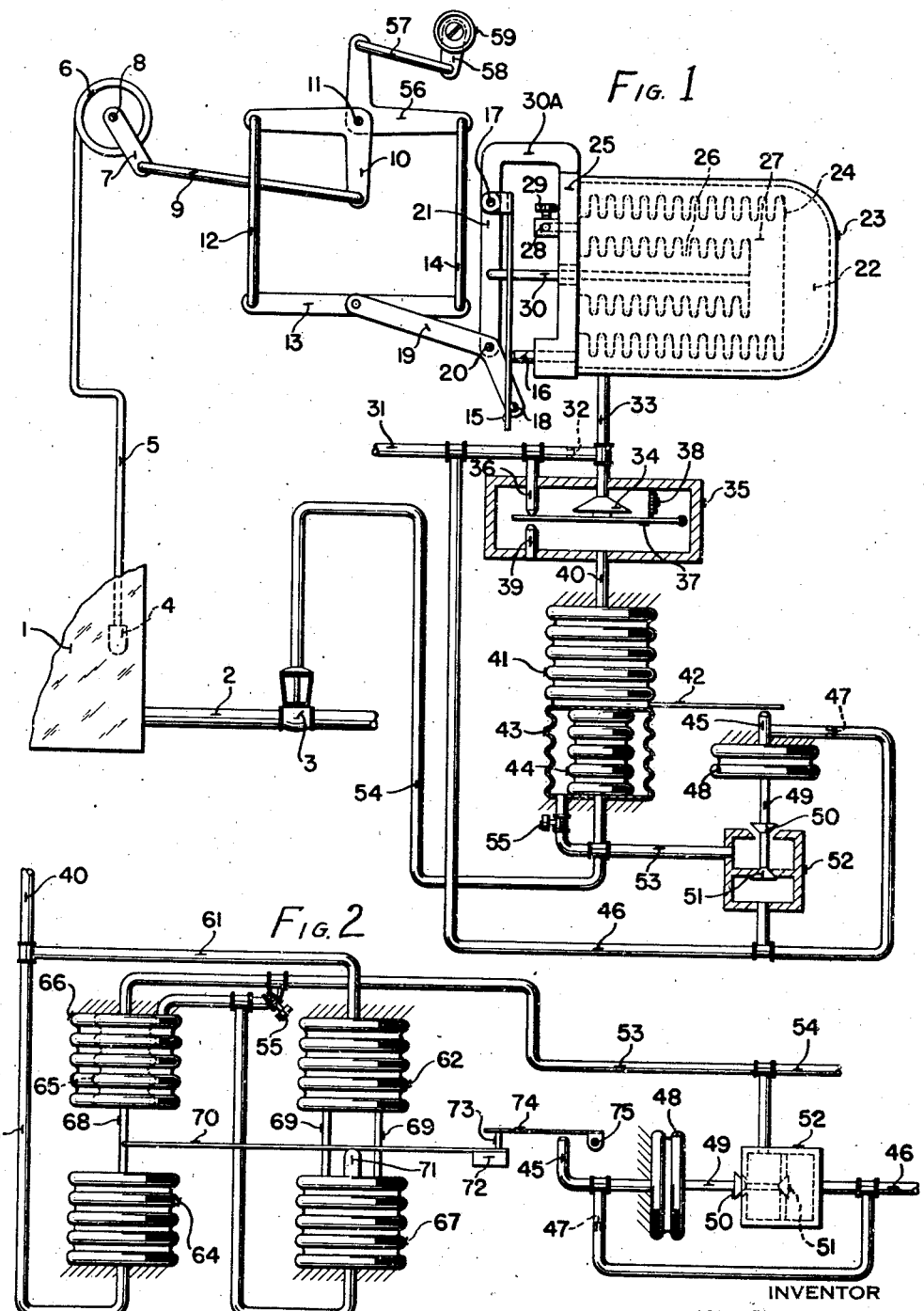

2,409,871

UNITED STATES PATENT OFFICE 2,409,871

AIR CONTROL INSTRUMENT

Anker E. Krogh, Mount Airy, Pa., assignor to The Brown Instrument Company, Philadelphia, Pa., a corporation of Pennsylvania Application October 13, 1939, Serial No. 299,287

20 Claims. (Cl. 121—41)

My present invention comprises improvements in fluid pressure control apparatus operating to create a control fluid pressure force which is impressed on a fluid pressure control motor or analogous control actuating element and which varies in accordance with changes in a control condition such, for example, as a temperature, a pressure, a height of liquid level, or a velocity, the controlling condition usually, though not necessarily, being returned to, or toward a normal value on a departure therefrom, by the operation of said motor or analogous device.

A main object of the present invention is to provide certain specific improvements in fluid pressure controlling apparatus of the type comprising means whereby a departure in the value of a controlling condition from a predetermined or normal value thereof, varies an air or other elastic fluid pressure control force, and whereby such initial variation in the control force produces a second control force adjustment quickly eliminating more or less of the initial change in the control pressure, and produces a subsequent third control force adjustment by which the effect of the second adjustment is neutralized at a rate suitably retarded to insure the regulation or control stability necessary to avoid hunting. Said second and third adjustments are sometimes referred to as "follow-up" and "compensating" adjustments, respectively, and the third adjustment is also sometimes referred to as an automatic resetting adjustment.

A further object of my invention is to provide an air control instrument which upon an initial change of the condition being controlled from normal will set up a control impulse that is greater than that which is necessary to return the condition to normal, and then gradually reduce this impulse at a rate suitably synchronized with the rate of the return of the condition to normal. In this manner the initial effect of the instrument is to over-correct and then remove part of the correction so that the condition will return to normal at a rapid rate.

Another main object of the invention is to provide fluid pressure control apparatus of the above mentioned character, which is characterized by its mechanical simplicity and reliability, and by its inclusion of means for readily effecting various adjustments required for optimum control results under a wide range of operating conditions, and the invention comprises various features of construction and arrangement desired and effective to that end.

The various features of novelty which characterize the present invention are pointed out with particularity in the claims annexed to and forming a part of this specification. For a better understanding of the invention, however, its advantages, and specific objects attained with its use, reference should be had to the accompanying drawing and descriptive matter in which I have illustrated and described a preferred embodiment of the invention.

Of the drawing:

Fig. 1 is a view of a complete control system embodying my invention; and

Fig. 2 is a view of a modified form of the apparatus.

Referring first to Fig. 1 there is shown therein by way of example a heater 1 whose temperature is to be controlled by means of a heating fluid supplied through a pipe 2. The supply of the fluid is adjusted by means of a valve 3 of the diaphragm type in which air under varying pressures is supplied to the diaphragm of the valve to proportionally control its opening. A bulb 4 that contains some temperature sensitive liquid that will expand upon heating thereof is inserted in the furnace and connected by a capillary 5 to the stationary end of a Bourdon tube 6 which is in the form of a helix. As the temperature of the heater increases the tube will unwind and move a lever 7 fastened to its free end and pivoted around the shaft 8. Movement of this lever is used to control the pressure applied to the diaphragm of valve 3 in the following manner. The free end of lever 7 is connected by a link 9 to one arm of a bell-crank lever 10 pivoted at 11, the other arm of which is connected to a link 12 that supports one end of the lever 13 which is pivoted around a normally stationary support 14. Movement of the lever 13 pivots a flapper valve 15 relative to a bleed nozzle 16 to throttle the escape of air therethrough. The flapper 15 is pivoted at 17 and has a normal bias toward the nozzle which bias is overcome by pin 18 on one arm of a bell-crank lever 19 that is pivoted at 20 on a lever 21 which is in turn also pivoted at 17. As the lever 13 moves up and down around its right-hand end the bell-crank 19, attached to the center thereof, is moved around its supporting point 20 to shift the position of pin 18 and flapper 15. The nozzle 16 communicates with a chamber 22 formed between a cup-shaped casing 23 and a bellows 24, both of which are attached at their open end to a supporting plate 25. Also attached to the plate 25 is a second and smaller bellows 26 which forms, with the bellows 24, a second chamber 27 that is in restricted communication with the atmosphere through an orifice 28 that is adjusted by a restricting member 29. The support 25 also has attached to it a member 30A that forms a support for the flapper 15 and the lever 21. A connecting link or rod 30 is attached at one end to the inner end of bellows 26, and at its other end to supporting lever 21.

Air is supplied to the chamber 22 and nozzle 16 at a suitably reduced pressure from a supply pipe 31 past a restriction 32 and through the pipe 33. This pipe 33 also communicates with a diaphragm 34 so that pressure changes in the chamber 22 will also be impressed upon the diaphragm. This diaphragm 34 is located within the casing 35 that is supplied with air directly from the pipe 31 through an inlet 36. Pivoted within the casing 35 is a valve member 37 that is normally biased toward the diaphragm 34 by spring 38 which is moved between the inlet 36 and an exhaust opening 39. In this manner changes in pressure in the chamber 22 cause movement of the valve 37 between the supply and exhaust openings to thereby proportionately vary the pressure within the casing 35.

Pressure changes within the casing 35 are applied through a line 40 to the interior of the bellows 41 which has attached to its movable lower end a valve member 42. Opposing the movement of the bellows 41 is a second bellows 43 having within it a smaller bellows 44, both of which are fixed at their lower ends to a suitable support. Movement of the valve 42 variably restricts the air escaping through a nozzle 45 that is supplied with air from the line 31 through a pipe 46 and a restriction 47. As the valve 42 moves relative to the nozzle 45 pressure within a bellows 48 will be changed to thereby move a valve rod 49 up or down to change the position of an exhaust valve 50 and an intake valve 51, relative to their respective ports in a valve casing 52 which is supplied with air from the line 46. As the valve rod 49 moves up and down to change the pressure in the upper part of the valve 52 the pressure will be supplied through a line 53 to the interior of bellows 44 and through a line 54 to the diaphragm of valve 3. Pressure will also be applied through a suitably adjustable restriction 55 to the interior of bellows 43 at a rate that is determined by the adjustment of the restriction.

In the operation of the instrument, upon, for example, an increase in the temperature of the heater due to a decrease in load the helix 6 will unwind and shift the link 9 to the left. This will, through the bell-crank 10, line 12, lever 13 and bell-crank 19 move the pin 18 to the left. Thus the flapper 15 is moved further from the nozzle 16, permitting more air to escape therethrough and reducing the pressure in chamber 22 and on diaphragm 34. This reduction of pressure in the chamber causes an elongation of the bellows 24, and through the inter-bellows space 27 an elongation of the bellows 26. Such an action shifts rod 30 to the right to provide the second or follow-up movement of the valve 15 and prevents too great an initial pressure change in the chamber 22. Simultaneously with the follow-up movement air begins to leak into the chamber 27 at a rate dependent upon the adjustment of the restriction 29, to return this pressure to that of the atmosphere. The slow compression of bellows 26 as the pressure in chamber 27 approaches that of the atmosphere again tends to decrease the supply of heating fluid to heater 1, but unless the heater temperature has become still higher in the meantime, the effect on the position of valve 15 of such compression of bellows 26 will be partially neutralized by the decrease in the heater temperature and the resultant change in position of bell-crank 19 on its support 21. If the temperature of the heater does not change after bellows 26 has contracted to its normal or unflexed length the valve 15 will come to rest in a position corresponding to a heater temperature slightly higher than would exist in a stable operating condition with a larger demand on the furnace for heat.

Contemporaneously with the above operations the initial decrease in pressure on the diaphargm 34 has permitted valve 37 to move upwardly to close inlet 36 and open exhaust duct 39 in the casing 35. This in turn causes a reduction in pressure in the bellows 41 so that it will contract and move flapper valve 42 away from the nozzle 45. The consequent reduction in pressure in bellows 48 lifts the valve stem 49 to close inlet valve 51 and open exhaust valve 52, thus permitting air to escape through lines 53 and 54 from above the diaphragm in valve 3, so that the valve can close an amount depending upon the change in air pressure.

Air will also escape from the bellows 44, permitting that bellows to tend to contract and move the flapper 42 toward nozzle 45. But since bellows 44 is smaller than bellows 41 the pressure decrease in 44 must be greater than the pressure decrease in 41 in order to bring flapper 42 back to its original position with respect to nozzle 45. Thus there is obtained a magnification of pressure change on the valve 3 over that which is called for by the original pressure change in chamber 22, or a pressure change on the valve 3 that is larger than necessary to correct the original change in the temperature of the heater 1.

As soon as the pressure in line 53 starts to reduce, air begins to leak through the adjustable restriction 55 at a rate dependent upon its opening to decrease the pressure in bellows 43 which tends to bring flapper 42 still nearer the nozzle 45, thus increasing the valve pressure gradually until the pressures in 41, 43 and 44 are substantially equal, except for the necessity of having valve 42 slightly higher than it originally was due to the displacement of the flapper 15 from its initial position.

From the above it will be seen that for any change in the heater temperature the pressure change on the valve 3 will be initially larger than that called for by the heater change. This initially large pressure change will then gradually be removed at a rate depending upon the opening of restriction 55. In practice the restriction 55 will be so adjusted with respect to the lag of the process being controlled that the initially large pressure change on the valve will be removed at a rate substantially equal to the rate of temperature change of the heater 1, thus rapidly bringing the temperature of the heater back to normal with a minimum of over-shooting or hunting.

In order to change the control point of the instrument, or the normal value at which the instrument tends to maintain the temperature of the heater, it is necessary to adjust the initial relation between the flapper valve 15 and the nozzle 16. This may be accomplished by shifting the link 14 lengthwise to change the fulcrum point of lever 13. To this end the upper end of link 14 is pivotally attached to one arm of a bell-crank 56, that is also pivoted at 11. The other arm of the bell-crank is moved by means of a link 57 that connects it with a crank 58 on a manually adjustable knob 59. Rotation of the knob will therefore shift the fulcrum point of lever 13.

If it is desired an indicator or pen arm may be attached to the bell-crank 10 to indicate or record the value of the heater temperature as measured by the helix 6 and a pointer may be attached to the bell-crank 56 to indicate the control point of the instrument. In such a case there must be provided a chart or scale with which the pointers may cooperate to indicate their position.

The embodiment of Fig. 2 operates in a manner substantially similar to that of Fig. 1. It differs therefrom, however, in the arrangement of the bellows so that a much larger magnification of the initial valve pressure change may be obtained than was possible with the arrangement of Fig. 1.

In Fig. 2 the line 40 extending from valve chamber 35 divides into two branches, the first, 61 leading to a bellows 62 that is fastened to a support at its upper end, and the second, 63 leading to a bellows 64 fastened at its lower end to a support.

The line 53 leading from the controlled pressure chamber of valve 52 communicates with the interior of a small bellows 65, corresponding to bellows 44 of Fig. 1. Air passing through the restriction 55, leading from line 53, is led to the interior of a bellows 66, surrounding the bellows 65, and to the interior of a bellows 67. The bellows 65 and 66 are attached at their upper ends to a stationary support and are joined at their lower ends by a link 68 with the upper end of bellows 64. Bellows 67 is attached to a stationary support by its lower end and is connected at its upper end by a pair of links 69 with the lower end of bellows 62.

A lever 70 is pivotally connected at one end to the link 68 and extends to the right, resting on a stud 71 projecting from the bellows 67. The right end of lever 70 has a weight 72 attached to it to hold it at all times in engagement with stud 71, and is provided with a pin 73 that is adapted to engage one end of a flapper 74, pivoted at 75, to move that flapper with respect to the nozzle 45.

In the operation of this embodiment, air is supplied through the line 40 from the casing 35 upon a movement of flapper 15 toward nozzle 16 as a result of a decrease in temperature of the heater 1 as a result of, for example, an increase in load thereon. This supply of air will increase the pressure in and the length of bellows 62 and 64 to pivot lever 70 clockwise around stud 71. This permits flapper 74 to throttle the flow through nozzle 45 to increase the pressure in bellows 48 and cause its expansion. This moves valve rod 49 to the right to close valve 50 and open valve 51, increasing the pressure in the line 54 and on control valve 3. This same pressure increase is applied, through the line 53, to the interior of bellows 65. Since the bellows 65 is smaller than bellows 64 and because of the mechanical advantage given by the lever 70, a very large increase in pressure on the valve 3 and the bellows 65 is necessary before the lever 70 moves far enough to lift flapper 74 enough to stop the pressure increase. At the same time air is leaking past restriction 55 into bellows 66 and 67 causing an additional counter-clockwise movement of lever 70 since link 68 moves further downward and stud 71 moves further upward. This decreases the pressure in bellows 48 and allows exhaust valve 50 to begin to open. The result of this action will be that the pressure on control valve 3 will be gradually decreased, and the process will continue until the pressure in bellows 65, 66 and 67 are substantially in equilibrium. It will be found that this pressure corresponds very closely to that in the bellows 62 and 64.

Because of the mechanical limitations it is practically impossible to get ratios of initial valve pressure increase in the form of the invention shown in Fig. 1 of more than about ten to one. This is due to the necessary sizes of the bellows 41, 43 and 44 that must be used. With the arrangement shown in Fig. 2, however, amplifications of the pressure supplied to the control valve 3 over that in line 40 may be greatly increased because of the mechanical advantage obtained by the use of lever 70. It will be obvious that the longer the length of lever 70 to the left of stud 71 with respect to its length to the right of the stud, the more the motion required of link 68 to return the flapper 74 to its original position for a given movement of the stud 71. Since the thing that moves the link 68 is the valve pressure, it follows that the nearer stud 71 is to pin 73, the greater the magnification obtained with this construction. To this end the bellows 62 and 67 and their connecting parts may, if desired, be so mounted that they can be adjustable toward and away from the bellows 64 and 66.

From the above it will be seen that I have invented an apparatus that will supply a large initial pressure to the control valve upon a change in the heater temperature which varies with the amount of change in the heater temperature and then remove this pressure at a rate dependent upon the rate of return of the temperature toward normal to thereby quickly return the condition to the control point upon a deviation therefrom. In other words I have invented an apparatus which responds to the rate of change of the condition under control.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent is:

1. In an air controlled instrument, the combination with a pressure operated control motor, a device movable in response to variations in a control condition, a supply of fluid under pressure regulated by said device, a second supply of fluid under pressure for said control motor, means operated by said first supply of fluid to increase or decrease the pressure of said second supply of fluid upon a change in the value of said condition, means operated upon the attainment of said increase or decrease to a value different from that of said first pressure to stop said increase or decrease and means to thereafter bring the value of the pressure of the second source of fluid back to the value of the pressure of the said first source of fluid as regulated by said device.

2. The combination of the preceding claim in which the increase or decrease of the value of the pressure of the second source of fluid pressure is a predetermined amount greater than that of the first source.

3. In an air control instrument, the combination with a device responsive to the variations in the value of a condition, a control motor to control the value of said condition, means operated by said device upon a deviation of said condition from normal to supply a control impulse to said motor larger than necessary to correct the deviation and to then slowly remove said control impulse comprising, a first bellows supplied with air under pressure proportional to said deviation, a second and smaller bellows opposing said first bellows, means operated by said first bellows to supply air under pressure to said control motor and to said second bellows to remove the effect of said first bellows, and means responsive to said last named pressure to gradually remove the effect of the same.

4. In an air controlled instrument, the combination with a device responsive to variations in the value of a condition, a pressure responsive control motor, means to supply a pressure impulse to said motor comprising a pneumatic relay having a first expansible chamber, a second and smaller chamber opposing said first chamber and a third chamber surrounding said second chamber, means operated by said device to supply air under pressure to one of said chambers to expand the same, and means operated by expansion of said chamber to supply air under pressure to the other chambers at different rates and to said motor.

5. In an air controlled instrument, a device movable in response to variations in the value of a control condition, a source of fluid under pressure regulated by movements of said device, a first bellows, a second and smaller bellows opposing the first, a second source of fluid under pressure regulated by movement of said first bellows, the first bellows being subjected to said first source of fluid, and the second bellows being subjected to the second source of fluid whereby the second source of fluid is greater than the first in proportion to the bellows areas, and means to gradually reduce the pressure difference between the two sources.

6. In an air actuated instrument the combination of a pair of opposed bellows having different areas, a second pair of opposed bellows having equal areas, a member moved in accordance with the lengths of the opposed pairs of bellows, means to subject one bellows of each pair to a pressure proportional to the value of a condition to move said member, means operated by said member to supply a pressure to said small bellows, another bellows surrounding the small bellows of an area equal to the bellows opposed thereby and means to gradually supply said last pressure to the remaining bellows at an adjustable rate to remove the effect of the first pressure.

7. The combination with an air controller of a device movable in response to variations in the value of a control condition, a supply of fluid under pressure, means to adjust said supply of fluid in response to movements of said device, a second supply of fluid under pressure, means including a pilot valve operated in response to pressure variations in said first supply of fluid to increase or decrease the pressure of said second supply of fluid normally in accordance with the increase or decrease in pressure of the first supply of fluid, and means to cause initially the increase or decrease in the pressure of the second supply of fluid to be greater than the increase or decrease in the pressure of the first supply of fluid, the said last means including means to change gradually the pressure of said second supply until it equals that of said first supply.

8. In a control apparatus for establishing a pneumatic control pressure, in combination, responsive means continuously and proportionally responsive to the value of a variable, valve means for controlling supply of air to establish said control pressure, first motor means having a relatively small effective operating area immediately and proportionally responsive to the control pressure and in conjunction with said responsive means operating said valve means in accordance with a first proportioning band, second motor means having a relatively larger effective operating area proportionally responsive in the same sense through resistance and capacity to said control pressure and in conjunction with said responsive means operating said valve means in accordance with a second proportioning band whereby said valve means is immediately and continuously responsive to the combined action of said responsive means and said first and second motor means to change quantitively said control pressure in proportion to changes in the value of said variable and to the rate of change of the value of said variable.

9. In a control apparatus for establishing a pneumatic control pressure, in combination, responsive means continuously and proportionately responsive to the value of a variable, valve means for controlling the supply of air to establish said pressure, first pneumatic motor means mechanically connected to said valve means and having a relatively small ratio of effective movement to pressure change, and immediately, continuously, and proportionately responsive to the control pressure and in accordance with such response and in conjunction with said responsive means operating said valve means in accordance with a relatively narrow proportioning band, second pneumatic motor means mechanically connected to said valve means and having a relatively larger ratio of effective movement to pressure change, and continuously proportionately responsive in the same sense through resistance and capacity to said control pressure and in accordance with such response and in conjunction with said responsive means operating said valve means in accordance with a relatively wide proportioning band, whereby said valve means is immediately and continuously responsive to the combined action of said responsive means and said first and second pneumatic motor means to change quantitatively said control pressure in proportion to changes in the value of said variable and to the rate of change of the value of said variable.

10. In apparatus for controlling a variable condition by varying the flow of a condition affecting agent, in combination, means responsive to variations in said condition, valve means for controlling supply and waste of air to establish a control pressure, first motor means having a relatively small operating area immediately and proportionally responsive to the control pressure and in conjunction with said responsive means operating said valve means in accordance with a first proportioning band, second motor means having a relatively larger operating area proportionally responsive in the same sense through resistance and capacity to said control pressure and in conjunction with said responsive means operating said valve means in accordance with a second proportioning band, whereby said valve means is immediately and continuously responsive to the combined action of said responsive means and said first and second motor means to change quantitively said control pressure in proportion to changes in the value of said variable and to the rate of change of the value of said variable.

11. In control apparatus for establishing a pneumatic control pressure, in combination, responsive means continuously and proportionally responsive to the value of a variable, valve means controlling the supply of air and the output of which valve means is said control pressure, an inner bellows directly connected with the output pressure of said valve means, an outer bellows containing said inner bellows and hermetically sealed therefrom and connected through resistance and capacity with said output pressure, said two bellows having a common fixed end and having a common movable end, which latter end acts with said responsive means but in opposite sense thereto to continuously operate said valve means to establish a pneumatic feed-back action to change quantatively said output pressure in proportion to changes in the value of, and the rate of change of, the value of the variable.

12. In control apparatus for establishing a pneumatic control pressure, in combination, responsive means continuously and proportionally responsive to the value of a variable, a valve means controlling the supply of air and the output of which valve means is said control pressure, an inner bellows directly connected with the output pressure of said valve means, an outer bellows containing said inner bellows and hermetically sealed therefrom and connected through resistance and capacity with said output pressure, said two bellows having a common fixed end and having a common movable end, which latter end acts with said responsive means but in opposite sense thereto to continuously operate said valve means to establish a pneumatic feed-back action to change quantitatively said output pressure in proportion to changes in the value of, and the rate of change of, the value of the variable, and the ratio of the effective areas of said bellows determining the ratio of the respective proportioning actions of the said bellows with said responsive means on said valve means.

13. In control apparatus for establishing a pneumatic control pressure, in combination, responsive means continuously and proportionally responsive to the value of a variable, valve means for controlling supply of air to establish said control pressure, first motor means immediately and proportionally responsive to the control pressure and in conjunction with said responsive means operating said valve means in accordance with a first proportioning band, second motor means proportionally responsive in the same sense through resistance and capacity to said control pressure and in conjunction with said responsive means operating said valve means in accordance with a second proportioning band, whereby said valve means is immediately and continuously responsive to the combined action of said responsive means and said first and second motor means to change quantitatively said control pressure in proportion to changes in the value of said variable and to the rate of change of the value of said variable, said resistance and capacity having minimum unadjustable values such that their combined effect has at least a minimum value necessary to obtain damped oscillation or aperiodic operation of the two motor means per se, and said resistance being adjustable above said minimum value to change the effect of the rate of change of the value of said variable on said control pressure.

14. In control apparatus for establishing a pneumatic control pressure, in combination, responsive means continuously and proportionally responsive to the value of a variable, valve means controlling the supply of air and the output of which valve means is said control pressure, an inner bellows directly connected with the output pressure of said valve means, an outer bellows containing said inner bellows and hermetically sealed therefrom and connected through resistance and capacity with said output pressure, said two bellows being resiliently-loaded and having a common fixed end and having a common movable end, which latter end acts with said responsive means but in opposite sense thereto to continuously operate said valve means to establish a pneumatic feed-back action to change quantitatively said output pressure in proportion to changes in the value of, and the rate of change of, the value of the variable, and wherein the valve means comprises a nozzle-baffle valve and a relay valve whose output pressure is the control pressure, and said relay valve being responsive to the operation of the nozzle-baffle valve which is conjointly operated by said bellows and said responsive means.

15. In control apparatus for establishing a pneumatic control pressure, in combination, responsive means continuously and proportionally responsive to the value of a variable, valve means for controlling supply of air to establish said control pressure, first motor means having a relatively small effective operating area immediately and proportionally responsive to the control pressure and in conjunction with said responsive means operating said valve means in accordance with a first proportioning band, second motor means having a relatively larger effective operating area proportionally responsive in the same sense through resistance and capacity to said control pressure and in conjunction with said responsive means operating said valve means in accordance with a second proportioning band whereby said valve means is immediately and continuously responsive to the combined action of said responsive means and said first and second motor means to change quantitatively said control pressure in proportion to changes in the value of said variable and to the rate of change of the value of said variable, and wherein the valve means comprises a nozzle-baffle valve and a relay valve whose output pressure is the control pressure, and said relay valve being responsive to the operation of the nozzle-baffle valve which is conjointly operated by said bellows and said responsive means.

16. Control apparatus for establishing a pneumatic control pressure comprising in combination, valve means, a condition responsive element subjecting said valve means to a controlling force varying in magnitude in accordance with changes in said condition, means for subjecting said valve means to two follow-up forces each opposing said controlling force, said means comprising first and second pressure actuated follow-up devices each mechanically connected to said valve means, and each constructed and arranged to create a follow-up force varying in proportion to the fluid pressure to which said device is subjected, and means through which on a change in said control force said valve means supplies pressure fluid to said first device as required to promptly vary the corresponding follow-up by an amount proportional to said control force change, and a restricted connection between said devices through which pressure fluid flows from one device to the other as required to gradually equalize the pressures actuating the two devices following a change in said control force.

17. Control apparatus as specified in claim 16 in which said devices are so proportioned and arranged that when the fluid pressures actuating the two devices are equal, the follow-up force created by said second device exceeds the follow-up force created by said first device.

18. In control apparatus for establishing a pneumatic control pressure in combination, valve means, a condition responsive element subjecting said valve means to a controlling force varying in magnitude in accordance with changes in said condition, means for subjecting said valve means to two follow-up forces having a total force and each opposing said controlling force, said means comprising first and second pressure actuated follow-up devices each mechanically connected to said valve means, said first device being constructed and arranged to create a follow-up force that under equilibrium conditions is a predetermined proportion of the total force, said second device being constructed and arranged to create a follow-up force supplying the remainder of the total force, and means through which said valve at first supplies fluid pressure to said first device as required to supply substantially the total follow-up force and to said second device to supply a small proportion of the follow-up force said last named means including a restriction through which pressure fluid may leak to said second device to reduce the force supplied by said first device to its given proportion.

19. In control apparatus for establishing a pneumatic control pressure in combination, valve means, a condition responsive element subjecting said valve means to a controlling force varying in magnitude in accordance with changes in said condition, means for subjecting said valve means to two follow-up forces having a total force and each opposing said controlling force, said means comprising first and second pressure actuated follow-up devices each mechanically connected to said valve means, said first device being constructed and arranged to create a follow-up force that under equilibrium conditions is a predetermined proportion of the total force, said second device being constructed and arranged to create a follow-up force supplying the remainder of the total force, and means through which said valve at first supplies fluid pressure to said first device as required to supply substantially the total follow-up force and to said second device to supply a small proportion of the follow-up force, said last named means including means to reduce the force supplied by said first device to its proportion of the total force.

20. In an air controlled instrument the combination with a controller responsive to the variations in the value of a condition and having an output pressure, a control motor to regulate a variable affecting the value of said condition, of means proportionally responsive to said output pressure and quantitatively proportional to the rate of change of said output pressure to create a control pressure for said control motor comprising a first bellows having a spring characteristic and supplied with said output pressure, whereby said bellows exerts a force proportional to said output pressure, a second bellows opposing said first bellows, a third bellows smaller than said second bellows and opposing said first bellows, said second and third bellows having a total effective operating area equal to that of said first bellows, valve means conjointly operated by said three bellows to regulate an air supply to establish said control pressure, an unrestricted connection for conducting said control pressure to said third bellows, and a restricted connection for conducting said control pressure to said second bellows, whereby when said output pressure is changing the value of said control pressure is caused to differ from said output pressure by an amount proportional to the rate of change of said output pressure, and when said output pressure is at equilibrium said control pressure equals said output pressure.

ANKER E. KROGH.